United States Patent
Antic et al.

(10) Patent No.: US 8,185,124 B2
(45) Date of Patent: May 22, 2012

(54) BASE STATION SYSTEM PERFORMANCE MEASUREMENT SYSTEM IN A GSM RADIO COMMUNICATION NETWORK

(75) Inventors: Mario Antic, Dugo Selo (HR); Boris Borkovic, Jastrebarsko (HR); Udier Davor, Zagreb (HR); Ljubo Jakic, Zagreb (HR)

(73) Assignee: T-Mobile Hratska d.o.o., Zagreb (HR)

( * ) Notice: Subject to any disclaimer, the term of this patent is extended or adjusted under 35 U.S.C. 154(b) by 380 days.

(21) Appl. No.: 12/084,517

(22) PCT Filed: Nov. 3, 2006

(86) PCT No.: PCT/IB2006/003983
§ 371 (c)(1),
(2), (4) Date: Jul. 19, 2010

(87) PCT Pub. No.: WO2007/063426
PCT Pub. Date: Jun. 7, 2007

(65) Prior Publication Data
US 2011/0014925 A1    Jan. 20, 2011

(30) Foreign Application Priority Data
Nov. 8, 2005 (HR) ............................ P 20050953 A (51) Int. Cl.
*H04W 72/08* (2009.01)
(52) U.S. Cl. .............. 455/452.1; 455/560; 455/561; 455/452.2; 455/446; 455/453
(58) Field of Classification Search .......... 455/452.1, 455/452.2, 560, 561, 446, 453
See application file for complete search history.

(56) References Cited

U.S. PATENT DOCUMENTS 6,366,780 B1 * 4/2002 Obhan .......................... 455/453
6,829,491 B1 * 12/2004 Yea et al. ..................... 455/560

* cited by examiner

Primary Examiner — Marivelisse Santiago Cordero
Assistant Examiner — Jean Chang
(74) Attorney, Agent, or Firm — Cooper & Dunham LLP (57) ABSTRACT

The invention relates to a system an a method for self optimizing a radio communication network comprising a plurality of radio cells, the system means for monitoring the network resource consumption and quality parameters individually for each cell, and means for distributing the network traffic dynamically between neighboring radio cells in order to maintain satisfactory quality of service in each radio cell.

3 Claims, 4 Drawing Sheets

Figure 3. Performance measurement system basic data structure

BASE STATION SYSTEM PERFORMANCE MEASUREMENT SYSTEM IN A GSM RADIO COMMUNICATION NETWORK

FIELD OF THE INVENTION

The invention relates to the field of mobile communication systems, and in particular to a base station system performance measurement system in a GSM radio communication network for self optimizing the radio communication network.

BACKGROUND OF THE INVENTION

Figure 1:
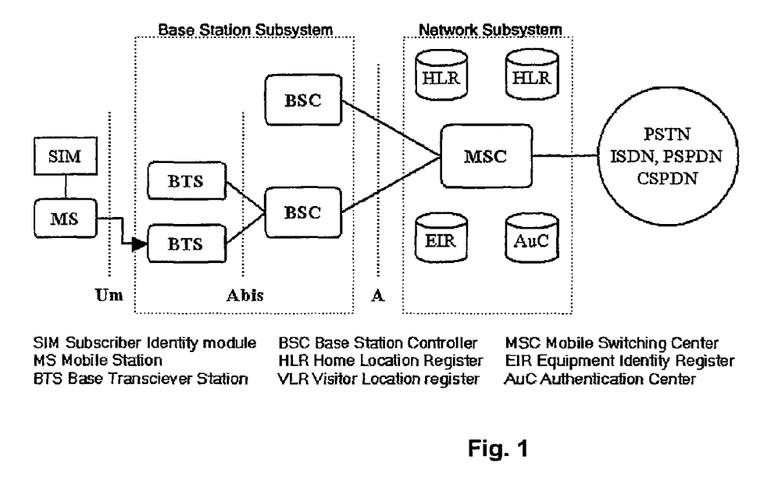
FIG. 1 shows the general structure of a GSM network.

A GSM network consists of multiple entities. FIG. 1 shows the general structure of a GSM network. A Base Station Subsystem (BSS) controls the radio link to mobile stations (MS) of subscribers including a Subscriber Identity Module (SIM). The Base Station Subsystem consists of Base Transceiver Stations (BTS) and Base Station Controller (BSC). They communicate via standard Abis-interface. A Network Subsystem, main part of which is a Mobile services Switching Center (MSC) performs connecting and routing of calls between mobile users or between mobile and fixed telephony users. Mobile station and BSS communicate over a Um-interface (air interface, radio link) while BSS communicates with MSC via an A-interface.

The Base Station Transceiver defines the cell and controls the radio link to mobile stations. The BSC controls the resources of one or more base stations, call setup procedures and different GSM radio link features like frequency hopping, power control, handover algorithms etc. The BSC is the connection between mobile station and MSC. Um-, Abis- and A-interfaces are standard interfaces organized in three (3) layers. Different procedures, like call setup, call release, handovers, power control procedures, etc., are performed and messages on layers 1, 2 and 3 are exchanged between mobile station and base transceiver station (BTS), BTS and base station controller (BSC) and BSC and mobile switching center (MSC). The BSC controls radio link parameters and call procedures (power control, handovers, call reestablishment, etc.) mainly using messages, counters and timers to control the flow of different procedures. Mobile and base station measurements and messages on Um-, Abis- and A-interfaces can be recorded in form of counters on BSC. The Network Subsystems comprises several databases, i.e. Home Location Register (HLR), Equipment Identity Register (EIR), Authentication Center (AuC) which contain information about subscribers, equipment and subscriber authentication.

After a new GSM site is built and covers a certain area with a radio signal, the situation concerning the telecommunication traffic is static. Traffic is handled by this base stations whose downlink signal strength received by the mobile station is the greatest. Uplink is not considered. Nowhere in a GSM system exists information regarding a receiving antenna branch problem (inherent for GSM standard and regardless of vendor), e.g. in form of an alarm which is visible for a maintenance team. Uplink problems can be caused by damaged connectors, water in cable or connector, feeder too long, etc. The strength of the signal transmitted by a mobile station towards the receiving branch of a serving base station is not taken into consideration during call setup and handover (change of the serving radio cell). Note: we are not discussing the old serving cell (handover). There is no information about uplink strength and quality for a new target cell. There is no uplink information until one already made handover or call.

Further, there are always changes in customers' behavior in certain geographical area due to seasonal migrations, road opening, road closing, new buildings blocking GSM signal, new shopping mall, etc.

Base station capacity is dimensioned according to information in the past. A new situation can spoil the previous "harmony" making some base stations overloaded and others underutilized. In reality it is very hard to monitor all traffic changes. It takes a lot of manpower to monitor and when an overload is spotted it is difficult to handle.

Performance Measurement Overview

Measurement Categories and Types

As an overview, base station system measurements can be grouped into different categories.

Radio resource related measurements: traffic channel (TCH), signal channel (SDCCH), control channel (CCCH) related measurements.

Procedure related measurements: immediate assignment, assignment, handover related measurements, etc.

Quality measurements: idle channel measurements (interference measurements), busy channel measurements (signal level and quality measurements).

Equipment related measurements: processor load, availability measurements, Abis-interface, A-interface, SS7 related measurements.

GPRS related measurements.

For example, before and during every connection (signal and traffic channels), both mobile and base station that is a serving cell for the call perform measurements of signal level (RXLEV) and bit error rate (BER) that is mapped to discrete RXQUAL levels according to table 1. RXLEV and RXQUAL measurements are averaged and send from mobile station to serving base station every SACCH multiframe (104 TDMA frames, approximately 480 ms). Those measurements are important for cell selection/reselection and handover procedures and are also an important indicator of speech quality and coverage issues in the cell area.

TABLE 1

Bit Error Rate (BER) to RXQUAL relation

| RXQUAL | BER |
| --- | --- |
| 0 | <0.2% |
| 1 | <0.4% |
| 2 | <0.8% |
| 3 | <1.6% |
| 4 | <3.2% |
| 5 | <6.4% |
| 6 | <12.8% |
| 7 | >12.8% |

Overview of Performance Measurement Tasks

There are several main reasons why the performance measurement (PM) is necessary part of any GSM network surveillance system:

Error Detection and Correction

Error sources as for example interference are hardly foreseeable during the network planning phase. Conclusions and feedback about the actual situation in network can be done with performance measurement. Error detection can be done from the point of view of mobile subscriber and from technical point of view. The most interesting performance indicators are:

Immediate assignment success rate

Assignment success rate

Call setup success rate

Handover success rate

Call chip rate

Traffic Load Measurement

The measurements of cells' traffic load are the basic information required for improvements and expansions of the offered calls. The following measurements are of great interest:

TCH traffic load (traffic offered, traffic carried, traffic lost due to congestion)
SDCCH traffic load (same as TCH traffic, for signaling channels)
Paging channels congestion
Access grant channel congestion
CCS7 load
Number of call setups
Number of handovers
Number of location updates Resource Availability Measurements It is possible to find out if all of the originally installed resources are available or partly available. If, for example, some of traffic channels (TCH) are not available that could lead to congestion of other TCHs of the cell and unsuccessful setups of new connections. The following resources are most important:

Traffic channels (TCH)
Slow dedicated control channels (SDCCH)
BSC, BTS, TRX availability
SS7 links
PCM connections Quality of Service (Qos), Grade of Service QoS is extremely important for the network operators. It is required to provide the mobile subscribers good speech quality and good grade of mobile services. By analyzing the measurement data, performance measurement can provide data about average seizure time of signaling and traffic channels allowing the conclusions about the duration of different procedures (logging into a cell, setup of a connection, etc.). Also very important measurements are TCH loss, handover loss, drop call and measurements of the cell's interference intensity.

Statistical data: For the network marketing and financial departments the data about participants' behavior are of the utmost importance. Different approaches to traffic analysis, different regional approaches in network planning and utilization and need to evaluate network functionality and performance objectively require mid- and long-term statistical analysis of the PM data.

The goals of PM are dependant on the tasks of different groups of users:

The Network Planning

Network planning is done under aspects of costs, geography, traffic density, traffic model, subscriber behavior. PM is used to support and evaluate the following:

verification of network configurations for future planning
evaluation of traffic density for planning the network growth
resource access
resource availability
quality of service PM helps plan the size of location areas (determining the number of pagings and location updates), the number and configuration of cells, cell parameters influencing the QoS, hardware equipment used etc.

Network Operation

Network operation performs network online supervision, fault detection, fault clearance and troubleshooting, resource availability etc. Number of dropped TCH/SDCCH connections, TCH/SDCCH congestion, handover drops, call success rate, processor loads and other indicators are monitored.

Network Optimization

Network optimization is responsible for improvement of network performance, cost efficiency and network quality from technical and customers' points of view. The main goals of PM are the improvement of:

Grade of service
Quality of service
Performance and utilization
Availability
Survivability PM is used to detect and resolve problems with network congestion, network errors, load problems, interference problems, capacity problems, network quality problems.

Marketing and Controlling

Marketing and controlling are planning the new services and evaluate the usage of existing. The main goals of PM are to provide data about:

usage of services and features (utilization)
customer behavior (regional, seasonal and daily differences in network usage)

Different GSM network subsystems provide measurements regarding performance of the subsystem. The most important for the listed tasks are BSS performance measurements and MSC (switching subsystem) measurements. MSC performance measurement (MSC statistics) is not a part of the subject BSS performance measurement system.

Every hardware equipment vendor provides the system for collecting the counters and measurements and storing the "raw" data in some format. For example, equipment, measurement reports (or logs) are collected and stored on BSC disks. Operators decide which counters are of interest and collect such information by creating so called scanners. Measurement is defined with given granularity that is commonly 1 hour in GSM networks (all statistics are on hourly basis). These measurement reports are transferred to an Operation and Maintenance Center of the Base station system (OMC-B) via X25 interface (procedure of measurement upload) and are stored in a database that is part of OMC-B. The measurements can be converted and exported in ASCII file that can be processed using different tools for performance measurement processing that are either available on market or are in-house solutions developed by GSM operators. Since the whole GSM network is controlled by several OMC-B systems and the vendor specific software for measurement processing provides only very basic functionality with no statistical analysis, it is necessary to collect, store and process measurements in order to provide the statistics for the whole network.

SUMMARY OF THE INVENTION

It is the object of the invention, to develop an information system for GSM network surveillance, collecting, processing and presentation of BSS subsystem performance measurements and network optimization.

This object is achieved by providing a system and method for self optimizing a radio communication network as described in the independent claim.

The invention provides a system and a method for self optimizing a radio communication network comprising a plurality of radio cells, the system comprising means for monitoring the network resource consumption and quality parameters individually for each cell, and means for distributing the network traffic dynamically between neighboring radio cells in order to maintain satisfactory quality of service in each radio cell.

Other features which are considered to be characteristic for the invention are set forth in the dependent claims, which are incorporated here for reference.

Problems with uplink (with problems in the receiving antenna branch of a base station) will cause unnecessary handovers (sometimes a ping-pong effect). In certain areas where a base station has problems with its uplink antenna branch, it will be impossible to make a call, despite the presence of another second base stations signal with good uplink but slightly weaker downlink signal. In normal terms that second base station could handle that call, but will not be allowed since the system will always chose the first base station with a better downlink signal but with a corrupted uplink branch.

The system according to the invention takes care of network monitoring and capacity issues mentioned above. The network can now follow customer migrations providing traffic capacity where it is needed (to the certain extend, of course). In GSM standard when a base station (a cell—more accurately) is congested, the next call is redirected to the second best "free" base station. In condition of significant overload users use the free base stations, not the nearest (the best one).

Due to traffic changes in an area resulting in traffic migrations from one base station to another, a first base station (radio cell) becomes underutilized whereas another base station (radio cell) becomes congested. As mentioned above, the congested one redirects calls around, damaging the quality of service in this area. Instead, according to the present invention, the radio access network parameters are adjusted to extend the coverage area of the first base station for grasping new traffic. It will also shrink the coverage area of the congested base station thus releasing users to the first base station. Thus, the base station load remains the same, preventing those "direct retry" handovers. As the congestion is higher, benefit is bigger.

Using computer analysis of performance measurements and algorithms developed for this purpose, a set of new values of radio network parameters is calculated and implemented in the network. System parameters are measured again and everything is repeated. Parameter changes are always small (by value) and slow (e.g., once per day), so sudden brief changes (events like a football match) would not be considered.

An exemplary embodiment of the invention is described in more detail below with reference to the drawings. Further characteristics, advantages and applications of the invention can be derived from the drawings and their description.

DETAILED DESCRIPTION OF AN EXEMPLARY EMBODIMENT OF THE INVENTION

Performance Measurement Information System

Figure 2:
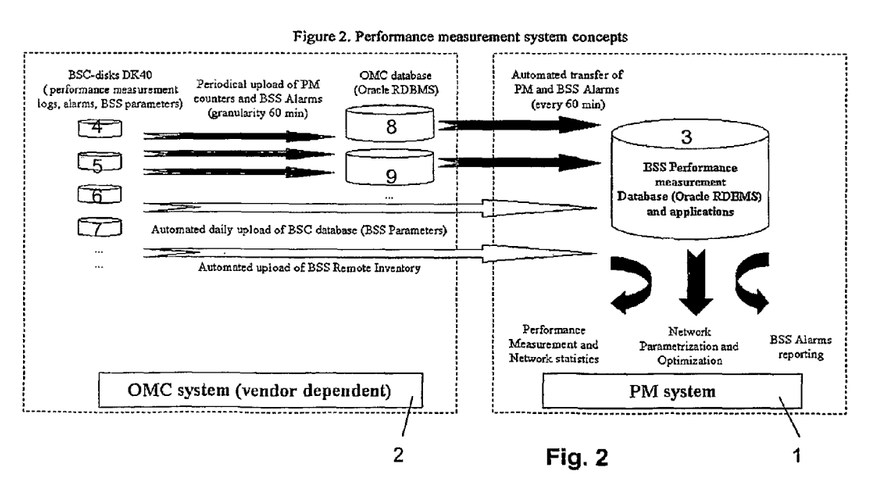
FIG. 2 shows the basic concept of the performance measurement system

The performance measurement system (PM system) 1 according to the invention is developed as an extension of an OMC-B system 2 with interfaces to the OMC-B system for completely automated measurement/data transfer. OMC-B 2 is the central point from which the BSS subsystems are controlled. Different reports and hardware alarms are collected. From this point all network maintenance regarding software changes is done (new software releases, BSS parameter changes, configuration changes, enabling and disabling features, etc.). Since OMC is connected to several BSS subsystems (it controls several BSSs) and generally different parts of GSM network can be implemented using equipment from different vendors (with their versions of OMC systems), it is required to create a new database 3 on a standalone server for the purpose of compiling, processing and safekeeping (warehousing) performance measurement data received from the OMC-B 2. That database 3 must collect large amounts of data preferably on hourly basis from different databases 4, 5, 6, 7, 8, 9 from OMC-B systems. The whole PM system acts as a part of the Network Management Center (NMC) since it collects performance and quality measurements, statistics and alarm reporting from all OMC-B servers in the network and provides complete network statistics. The database 3 collects large amounts of data from different databases and processes them in real-time, correcting erroneous measurement report and computing different statistics. From raw counters and measurements, standard GSM formulas and other statistical values must be calculated, e.g. call success rate, handover success ratios, dropped calls, speech quality index, etc., to provide efficient network monitoring on all levels, that is individual cells, BSCs, subregions, regions, MSCs and the network as a whole.

The performance measurement system 1 collects data from the OMC-B system 2 as well as from BSCs automatically. The system is preferably based on a relational database system. Performance measurements and BSS alarms are collected directly via TCP/IP network using database links from databases 8, 9 on OMC-B servers, decoded, processed and stored in the new standalone database 3, while data from BSS databases 4-7 stored on BSC's disks (required for network parameterization and optimization as well as network surveillance) is being collected in the form of binary files using command line interface (CLI) features of OMC UNIX system. The PM system 1 combines these performance measurement data with BSS alarms and network parameters extracted from actual databases stored on BSC's hard disks 4-7 in order to provide a comprehensive statistical tool for quality reporting and optimization.

The invention relates to an information system according to real-life environment in the network that must support the business processes of the GSM network operator.

The following requirements and specifications are to be met (see also FIG. 3):

Data Availability and Warehousing

Figure 3:
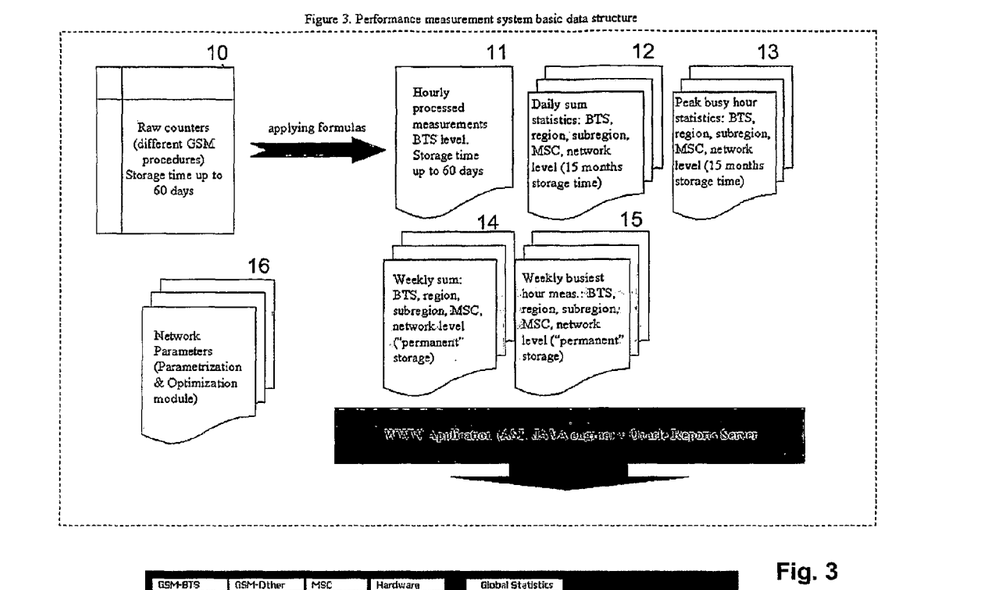
FIG. 3 shows the basic data structure of the performance measurement system.

Real time surveillance: Measurement data is retrieved from the BSS subsystem on hourly basis providing the real time surveillance of the network operation. Maintenance teams installing equipment and repairing hardware malfunctions are coordinated from a central point with one hour feedback for all work done on site. All PM raw data counters (see box 10) are retrieved and stored with selected granularity. Common values for time granularity are 5, 15, 30, 60 minutes.

Industrial standard is usually 60 minutes and that is the preferred granularity period used in the invention. Because of the great amounts of raw and processed data, measurements are kept on a hourly basis only for a certain period of time depending on the type (or class) of measurements ranging from 15 to 60 days (see box 11). This period is customizable depending on the situation in the network. The most important measurement and indicators regarding the functionality of BSS subsystem are used to detect network problems, and in the network optimization and parameterization process which is carried out by a parameterization and optimization module 16.

Network operation and statistics: Hourly based measurements of a single radio cell are extremely space- and resource-consuming even for very small networks and thus inadequate for mid- and long-term network management tasks and reporting. So the following kinds of statistical data is computed, filtered and warehoused to support the business processes and analysis.

Individual cells. All performance measurement statistics for cells are calculated in the form of Daily sum (see box 12) and Peak Busy Hour (PBH) measurements (measurement in the hour with the largest TCH traffic), (see box 13). Daily sum PM 12 is the most important for statistical purposes and evaluation of the network quality and availability while PBH measurements 13 are important for capacity planning, congestion detection, network element utilization statistics etc. Data history of 15 months or more (as required) is kept. Beside daily statistics, also weekly statistics for each cell is computed. The data is a weekly sum (see box 14) of measurements and the measurements in week's busiest hour (see box 15). This data is kept as required for the longer period because it gives good long-term overview of network and single cell/site operation.

Regional and summary statistics: The whole communication network is divided into regions and subdivided into smaller subregions. Different subregions have different traffic profiles and customer behavior. The most important differences are in tourist regions with seasonal changes in network utilization. Daily sum statistics 12 and PBH measurements 13 are calculated for the subregions, the regions and the whole network and also for MSCs. Weekly statistics (sum and PBH) are also calculated for subregions, regions, MSCs and the whole network. This data is important for an analysis of changes in the network configuration, optimization of network or parts of network. The data history period for this data is practically unlimited.

Key performance indicators (KPI) for evaluation of technical status of the network. Some KPI derived from performance measurement data are dependent on changing external data sources, e.g. MSC measurements, administrative categorization of cell types—urban/rural/roads . . . etc., and have to be computed and warehoused for business plan analysis purposes and technical evaluation of the network.

The data history period depends on the size of the GSM network, e.g. the number of radio cells, business plan requirements and hardware specifications of the database server, e.g. available hard disk space and speed, CPU number and speed, backup strategies and devices, etc. Also the number of simultaneous users determines the size of tables and data files since the database queries are usually complex and time consuming.

The administration of the PM database 3 is performed via standard database administration tools. Because of the size of the database 3 (tens of gigabytes per year), it is necessary to perform regular database health checks as well as regular DB backup.

Formulas

From raw counters and measurements, standard GSM formulas and other statistical values must be calculated, for example call success rate, handover ratio, dropped calls, etc., to provide efficient network monitoring on all levels, that are individual cells, BSCs, subregions, regions, MSCs and the network as a whole. Most of the formulas applied are accepted as standards in GSM. Some of the formulas recommended by the vendor are not quite accurate and had to be adjusted to describe realistically events in the network. Beside standard and widely used formulas such as immediate assignment, handover success/failure rate or TCH loss, the development team has invented several useful formulas and algorithms that help detect problems in the network such as fairly accurate estimation of actual speech quality, antenna malfunctions, malfunctioning transceivers, etc. One example is formula (I) for uplink/downlink misbalance estimation developed and used for network optimization in our network.

$$\Delta(dB) \approx holthlvd - holthlvul + 5 * \log_{10}(AttUL/AttDL) \qquad (1)$$

$\Delta$ (in dB) is the difference in sensitivity of receiving system in base station and mobile station, holthlvdl and holthlvul are actual parameter settings for uplink and downlink imperative handover levels (in dBm) and AttUL and AttDL is sum of uplink and downlink strength handover attempts in a observed period of time (usually 4-5 days). Since cell modeled coverage is planned and measured as downlink coverage and cell selection/reselection and handover procedures are based on signal levels measured in downlink, using this formula it is possible to detect and optimize parts of the network with severe uplink problems either using additional amplifiers in the receiving branch of BTS or by means of adjusting GSM parameters affecting cell (re)selection and handover algorithms in such a manner to take into account observed problems with uplink signal level.

Also some modification have to be made in order to eliminate errors in measurement processing on BSC side due to hardware and network problems or problems with different software releases co-existing on the different network elements. Since performance measurement cannot be absolutely accurate regardless of equipment manufacturer it is important to process data in such manner that gives a good overview of trends in network. The PM system has to have built-in detection of erroneous data and has to ignore such measurements that could corrupt the statistics of the whole network.

Client Application (Presentation)

The user interface towards end-users is implemented as a WEB application using for example Microsoft® IIS and Apache® WWW servers, ASP and JAVA® technologies). Clients need only Internet Explorer to access and use most features of the performance measurement system. Since IE is part of Windows® O/S, no client side installation is required. Username and password authentication is used in order to secure access the application and database. Some information classified as secret are accessed using SSL as widely accepted standard for intranet/internet secure connections.

For Network management and performance analysis it is necessary to develop reporting techniques for monitoring the network operation since it is almost impossible and certainly not cost-efficient to monitor each individual cell. Graphical representation of data and trend analysis are very important in detecting the bottlenecks in the network. After quick detection, in-depth analysis of the problem is performed combining other sources of information (on-site inspection of hardware for example).

Figure 4:
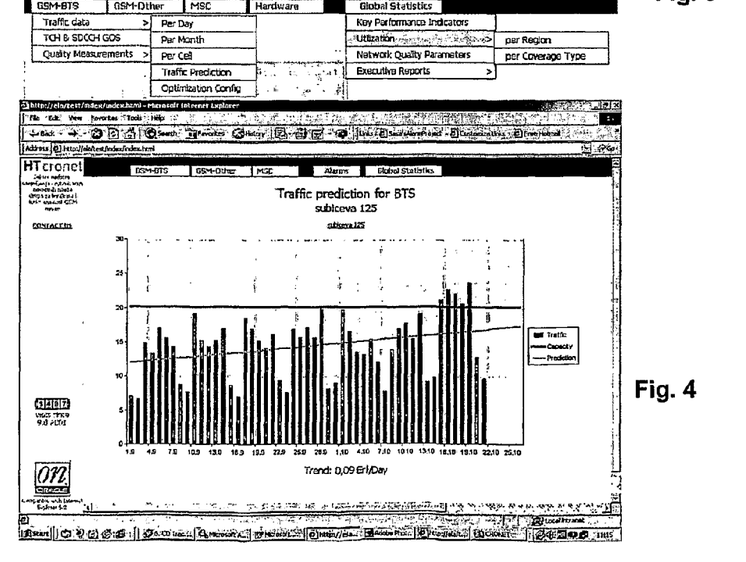
FIG. 4 shows an example screenshot of the user application (user interface).
Figure 5:
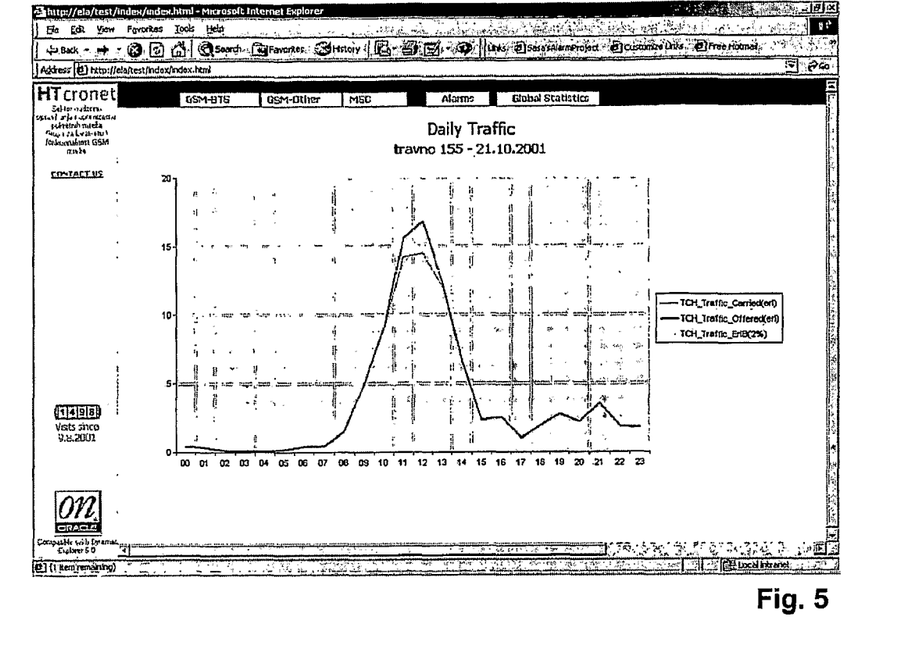
FIG. 5 shows an example screenshot of the user application (user interface).
Figure 6:
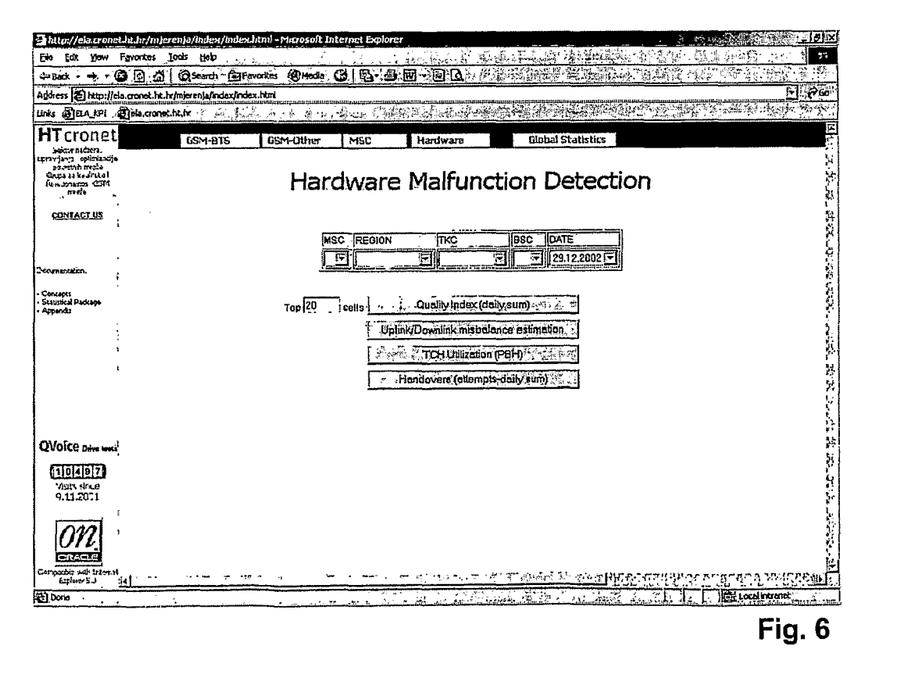
FIG. 6 shows an example screenshot of the user application (user interface).

In FIGS. 4, 5 and 6 some example screenshots of the Client application are presented.

Based on the Performance Measurement data collected on the hourly basis, it is entirely possible to perform in-depth network analysis of network key performance indicators as well as the utilization of the network resources. After a successful network planning phase it is very important to ensure network services availability in the following period. The basic concept is to monitor network resource consumption and quality parameters on daily basis and to "shift" network traffic dynamically between neighboring cells in order to maintain satisfactory quality of service using existing equipment. This concept is equivalent to re-planning the network within (of course) given physical limitations. Our results show that by using the developed optimization algorithm it is possible to improve KPIs as well as the utilization of cells dynamically, as the situation in the network changes for example due to growing number of subscribers; changing traffic distribution, extraordinary situations like fairs, etc. Furthermore, it is possible to put different emphasis on KPI/Utilization ratio and considerably improve for instance utilization scarifying partly network quality or vice versa. Tests were also conducted to improve speech quality in the selected area. Using different network parameters the optimizer module can virtually resize cells in order to "push" mobile stations towards the cell that is actually "best serving cell" or make decision on parameters that influence speech quality based on real situation in the network (e.g. RXLEV and RXQUAL statistics as mentioned in II. A). The optimizing algorithm acts as the "upgrade" of the built-in GSM software logic that BSC/BTS system uses to determine the "best cell" since it takes into account different quality factors other than merely downlink strength.

The changes in the network configuration are made continuously in smaller steps so the system has built-in latency which prevents bigger changes in the behavior of the whole network due to unpredictable conditions (sport events, fairs, etc.).

Figure 7:
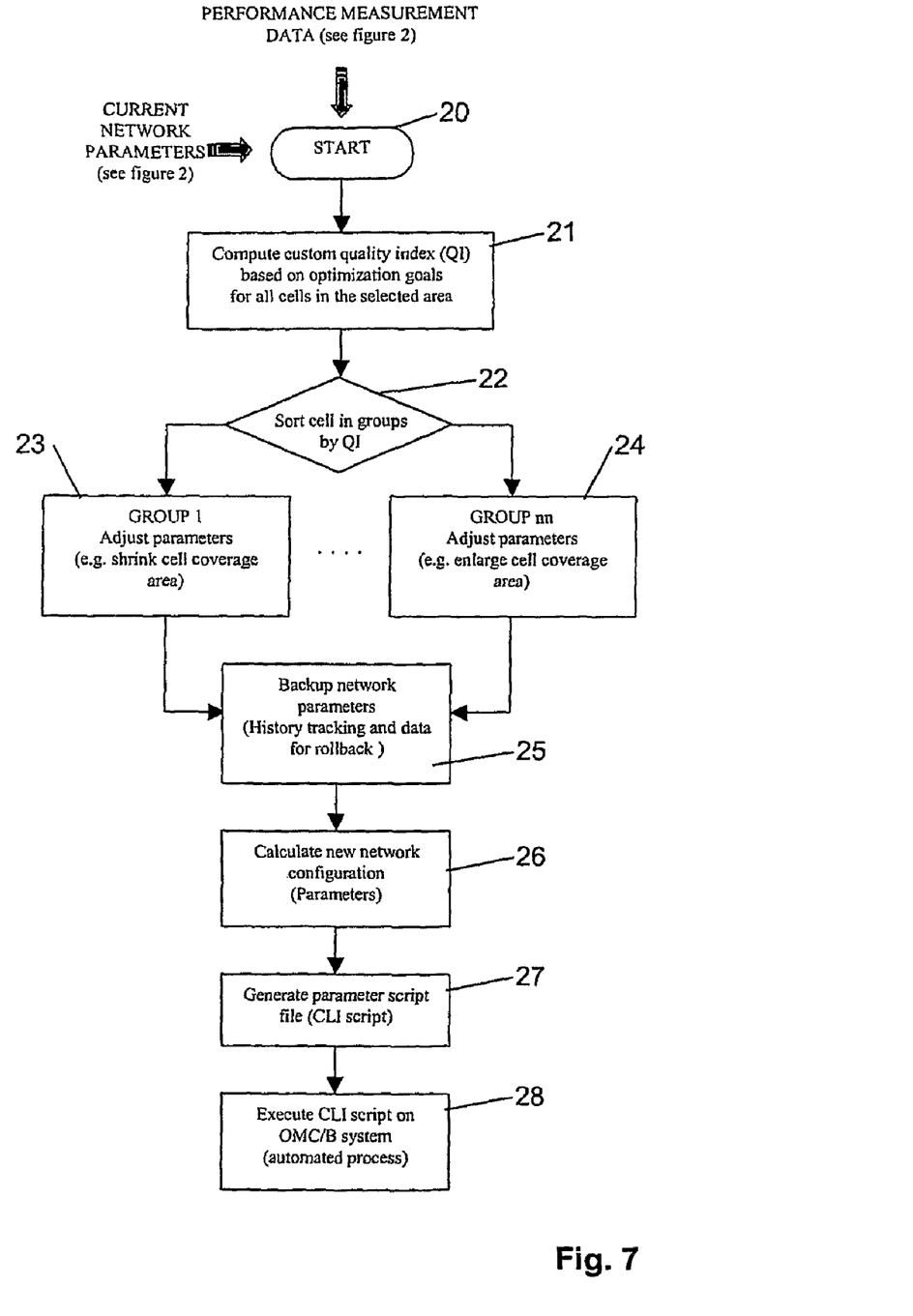
FIG. 7 shows a flowchart of the network performance optimization process.

FIG. 7 shows a flowchart of the network performance optimization process. The process starts with retrieving input data, that is the performance measurement data and the current network parameters as shown in FIG. 2 (Step 20).

The next step is the computing of a custom quality index (QI) based on predetermined optimization goals for all radio cells in the selected area (Step 21). The method proceeds with sorting the radio cells in groups, e.g. group 1 to nn, according to their individual Qi values (step 22). For example, group 1 contains the radio cell with the lowest quality index, group nn the radio cells with the highest quality index.

To improve the quality index for the radio cells of group 1, the current cell parameters have to be adjusted, e.g. by shrinking the radio cell coverage area (step 23). To reduce the QI for the radio cells of GROUP nn which are underutilized, the current cell parameters have to be adjusted, e.g. by enlarging the radio cell coverage area (step 24). The next step 25 is to backup the network parameters for history tracking purposes and having data for rollback, if necessary In step 26; the new network configuration, i.e. the new configuration parameters, are calculated. In step 27 a parameter script file (CLI script) is generated an executed on OMC-B system as to step 28 in an automated process.

The invention claimed is:

1. System for self optimizing a radio communication network comprising a plurality of radio cells, the system comprising:
    means for monitoring network resource consumption and quality parameters individually for each cell, and
    means for distributing network traffic dynamically between neighboring radio cells in order to maintain satisfactory quality of service in each radio cell,
    wherein the means for distributing network traffic is configured to
    retrieve input data, including performance measurement data and current network quality parameters,
    compute a custom quality index, QI, based on predetermined optimization goals for all radio cells in a selected area,
    sort the radio cells into groups according to their individual QI values, wherein a first group 1 contains a radio cell with the lowest quality index, and an endmost group nn contains radio cells with the highest quality index,
    improve the quality index for the radio cells of group 1 by adjusting the current cell parameters and shrinking the radio cell coverage area,
    reduce the quality index for the radio cells in group nn which are underutilized, by adjusting the current cell parameters and enlarging the radio cell coverage area,
    calculate the new network configuration parameters, and
    wherein the system is an extension system of an operation and maintenance center of a base station system, OMC-B, with interfaces to the OMC-B system and to assigned base station controllers, BSC, for completely automated measurement and data transfer of performance measurement data, and
    wherein the system comprises a database for compiling, processing and safekeeping performance measurement data received from OMC-B of the network radio cell sites, and
    wherein the system is part of a Network Management Center, NMC, in order to collect performance and quality measurements, statistics and alarm reporting from all OMC-B servers in the network and provide complete network statistics.

2. Method for self optimizing a radio communication network comprising a plurality of radio cells, the method comprising the steps of:
    monitoring the network resource consumption and quality parameters individually for each cell, and
    distributing the network traffic dynamically between neighboring radio cells in order to maintain satisfactory quality of service in each radio cell
    said distributing step further comprising the steps of:
        retrieving input data, including performance measurement data and current network quality parameters,
        computing of a custom quality index, QI, based on predetermined optimization goals for all radio cells in a selected area,
        sorting the radio cells into groups according to their individual QI values, wherein a first group 1 contains a radio cell with the lowest quality index, and an endmost group nn contains radio cells with the highest quality index,
        improving the quality index for the radio cells of group 1 by adjusting the current cell parameters and shrinking the radio cell coverage area,
        reducing the quality index for the radio cells in group nn which are underutilized, by adjusting the current cell parameters and enlarging the radio cell coverage area performing a backup of the network parameters for history tracking purposes and having data for rollback, calculating the new network configuration parameters, generating a parameter script file and executing the script file on an Operation and Maintenance Center of the base station system, OMC-B, in an automated process, and the method further comprising the steps of, monitoring the network resource consumption and quality parameters on a daily basis, and automatically collecting, decoding and processing performance measurement data from the OMC-B systems as well as from base station controllers, BSC, and storing them in a database, whereas these performance measurement data are combined with BSS alarms and network parameters extracted from actual databases in order to provide comprehensive information for quality reporting and optimization.

3. A system comprising:

a processor; and a program storage device readable by the system, embodying a program of instructions executable by the processor to perform steps for self-optimizing a radio communication network comprising a plurality of radio cells, the steps comprising the method set forth in claim 2.

* * * * *